(12) United States Patent
Witel et al.

(10) Patent No.: US 6,721,336 B1
(45) Date of Patent: Apr. 13, 2004

(54) STS-N WITH ENHANCED GRANULARITY

(75) Inventors: Rodney Witel, Rohnert Park, CA (US); Jason Dove, Novato, CA (US); Paul Franceschini, Petaluma, CA (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/469,569

(22) Filed: Dec. 22, 1999

(51) Int. Cl.[7] .................................................. H04J 3/24
(52) U.S. Cl. ........................ 370/474; 370/470; 370/464
(58) Field of Search .............................. 370/395, 105.2, 370/16, 84, 100.1, 250, 466, 375, 395.1, 408, 395.4, 395.41, 395.42, 395.43, 474, 468, 471, 442, 443, 444; 364/514; 375/372

(56) References Cited

U.S. PATENT DOCUMENTS

| | | | |
|---|---|---|---|
| 5,309,441 A | 5/1994 | Kuroda ..................... | 370/105.2 |
| 5,365,510 A | 11/1994 | Nicholson et al. ............ | 370/16 |
| 5,436,890 A * | 7/1995 | Read et al. ................. | 370/352 |
| 5,490,142 A * | 2/1996 | Hurlocker .................. | 370/465 |
| 5,548,534 A | 8/1996 | Upp ........................ | 364/514 R |
| 5,619,498 A | 4/1997 | Sharpe ...................... | 370/396 |
| 5,675,580 A * | 10/1997 | Lyon et al. ............. | 370/395.51 |
| 5,796,795 A | 8/1998 | Mussman et al. ........... | 375/372 |
| 5,850,387 A * | 12/1998 | Lyon et al. ................. | 370/250 |
| 5,917,827 A | 6/1999 | Cantwell ..................... | 370/466 |
| 5,923,653 A * | 7/1999 | Denton ....................... | 370/375 |
| 5,970,068 A * | 10/1999 | Gray et al. ............... | 370/395.5 |
| 6,069,876 A * | 5/2000 | Lander et al. .............. | 370/249 |
| 6,169,749 B1 * | 1/2001 | Dove et al. ................. | 370/474 |
| 6,310,891 B1 * | 10/2001 | Dove et al. ................. | 370/470 |
| 6,396,853 B1 * | 5/2002 | Humphrey et al. ......... | 370/535 |

* cited by examiner

*Primary Examiner*—Wellington Chin
*Assistant Examiner*—Jamal A. Fox
(74) *Attorney, Agent, or Firm*—Craig A. Hoersten; Richard A. Mysliwiec; V. Lawrence Sewell

(57) ABSTRACT

STS-n with enhanced granularity is achieved by using an ATM cell framer which includes a plurality of cell delineators and cell assemblers for conversions between broadband STS-n which occupies at least a portion of a bandwidth of a synchronous payload envelope (SPE), such as a synchronous optical network (SONET) bandwidth, and asynchronous transfer mode (ATM) cells. The SONET bandwidth is flexibly and efficiently allocated for transporting the broadband STS-n which carries ATM data, wherein n can be varied in small increments to allow the SONET bandwidth to be shared with narrowband STS if the broadband STS-n does not occupy the entire SONET bandwidth.

48 Claims, 4 Drawing Sheets

STS-N WITH ENHANCED GRANULARITY

BACKGROUND OF THE INVENTION

1. Field of the Invention

The present invention relates to telecommunications, and more particularly, to asynchronous transfer mode (ATM) and synchronous transport signal-n (STS-n) communications.

2. Background

The telecommunications industry has developed standards for transporting communication signals synchronously using a synchronous payload envelope (SPE). An example of an industry-standard SPE is a synchronous optical network (SONET) frame, which has a frame length of 125 μs and a frame rate of 8 KHz. Conventional digital telephony signals are formatted for SONET communications over a conventional narrowband synchronous transport signal (STS) interface. Standards developed for the STS include STS-1, which is a synchronous transport signal-level 1, STS-3, which is 1a synchronous transport signal-level 3, and STS-12, which is a synchronous transport signal-level 12.

It is desirable that asynchronous transfer mode (ATM) cells be transported in the form of an STS within the bandwidth of a standard SPE, such as a SONET frame. Schemes have been developed for delineation and assembly of ATM cells as broadband STS for SONET communication. Conventional SONET bandwidth allocation allows a standard SONET frame to be divided into SONET bandwidth portions for carrying 12 STS-1 signals, 4 STS-3c signals, or a single STS-12c signal. For STS-3c and STS-12c, the letter "c" stands for "concatenated". ATM cells which are transported over the SONET as broadband STS are in the form of broadband STS-1, broadband STS-3c, or broadband STS-12c.

Because the standard broadband STS for carrying ATM traffic must be in the form of STS-1, STS-3c or STS-12c, conventional cell delineation and assembly may result in inefficient allocation of the SONET bandwidth if the ATM cells occupy some but not all of the SONET bandwidth and do not fit exactly within the bandwidth allocated for a single STS-1, a single STS-3c, or a single STS-12c. Because of the limitation of standard STS formats to STS-1, STS-3 and STS-12, conventional SONET transport of ATM cells using conventional ATM cell delineation and assembly techniques may result in significant portions of the SONET bandwidth being wasted when ATM cells are transported over the SONET.

Therefore, there is a need for efficient SONET bandwidth allocation for transporting ATM cells over the SONET. Furthermore, it is desirable that efficient SONET bandwidth allocation be achieved with enhanced granularity of STS-n without requiring highly complicated hardware designs for ATM cell delineation and assembly of non-standard STS.

SUMMARY OF THE INVENTION

In accordance with the present invention, a method of allocating bandwidth for transporting asynchronous transfer mode (ATM) cells in the form of a synchronous transport signal-n (STS-n) in a temporal frame roughly comprises the steps of:

(a) dividing the temporal frame into a plurality of bandwidth portions;

(b) assigning a first number of the bandwidth portions for transporting ATM cells; and (c) assigning a second number of the bandwidth portions for transporting a narrowband STS.

In an embodiment, the temporal frame comprises a synchronous optical network (SONET) frame, which defines a synchronous payload envelope (SPE) for the STS. In an embodiment, the SONET frame is divided into twelve equal bandwidth portions capable of carrying ATM traffic in the form of broadband STS as well as conventional narrowband STS. The bandwidth of the SONET frame for transporting the ATM traffic is capable of being dynamically and flexibly allocated based upon the size of the ATM payload. In an embodiment, the first number of bandwidth portions for transporting the ATM cells can be any integer between 0 and 12, and the second number of the bandwidth portions for transporting the narrowband STS can also be any integer between 0 and 12. In this embodiment, the sum of the first and second integers is equal to 12.

In an embodiment in which the SONET frame is divided into twelve equal bandwidth portions, a first ten of the bandwidth portions for transporting the ATM cells are delineated by four cell delineators, and an eleventh bandwidth portion following the first ten bandwidth portions for transporting the ATM cells is delineated by a fifth cell delineator. In an embodiment, a single cell delineator is used for delineating the ATM cells in the form of a broadband STS-12c signal if all of the twelve bandwidth portions in a SONET frame are allocated for transporting the ATM cells.

In an embodiment, the ATM cells are carried within the SONET frame in the form of at least one broadband STS selected from the group consisting of standard STS-1, STS-3c, and STS-12c. The ATM cells within each SONET frame may be transported in the form of a broadband STS-n signal which is equivalent to a combination of one or more standard STS-1 or STS-3c signals. For the broadband STS-n signal, n may be any integer between 1 and 12. The broadband STS-n is formed as a combination of broadband STS-1 or STS-3c signals if it is not an STS-1, STS-3c or STS-12c itself. In an embodiment in which the broadband STS-n signal carrying the ATM cells does not completely occupy the SONET bandwidth, a narrowband STS can be multiplexed with the broadband STS within the SONET frame.

The present invention also provides an asynchronous transfer mode (ATM) cell framer, roughly comprising:

(a) a plurality of cell delineators having a plurality of synchronous transport signal (STS) cell delineator inputs, a plurality of cell delineator framer control inputs and a plurality of cell delineator outputs capable of outputting a plurality of ATM cells;

(b) a plurality of cell assemblers having a plurality of cell assembler inputs, a plurality of cell assembler framer control inputs and a plurality of cell assembler outputs; and (c) a cell framer controller, connected to the cell delineator framer control inputs and the cell assembler framer control inputs, to provide synchronization to the cell delineators and to the cell assemblers.

In an embodiment, the cell framer further comprises a cell delineator output multiplexer connected to the cell delineator outputs, to generate an output ATM data stream comprising the ATM cells extracted from the broadband STS-n. In a further embodiment, the cell delineators each comprise a cell delineator buffer connected to the cell delineator output multiplexer. In yet a further embodiment, the cell delineator buffer in each of the cell delineators comprises a first-in-first-out (FIFO) buffer memory. In an embodiment, the cell framer controller is also connected to the cell delineator output multiplexer to provide a transmit starter cell signal for the output ATM data stream.

In an embodiment, the cell framer further comprises a cell assembler input multiplexer connected to the cell assembler inputs. The cell assembler input multiplexer is capable of receiving an input ATM data stream comprising a plurality of ATM cells for assembly by the cell assemblers to form a broadband STS-n. In a further embodiment, the cell assemblers each comprise a cell assembler buffer connected to the cell assembler input multiplexer. In yet a further embodiment, the cell assembler buffer in each of the cell assemblers comprises a FIFO buffer memory. In an embodiment, the cell framer controller is also connected to the cell assembler input multiplexer to provide a receive starter cell signal for the input ATM data stream.

In an embodiment, the cell framer further comprises a cell delineator input multiplexer having an STS-n input and a plurality of outputs connected to the cell delineator inputs respectively, wherein n is an integer between 1 and 12. In a further embodiment, the cell delineators each comprise a serial-to-parallel converter connected to a respective one of the outputs of the cell delineator input multiplexer for cell delineation. In an embodiment, the cell framer controller is also connected to the cell delineator input multiplexer to synchronize the arrival of the STS-n signal from the STS-n input.

In an embodiment, the cell framer further comprises a cell assembler output multiplexer having a plurality of inputs connected to the outputs of the cell assemblers respectively, and an STS output capable of outputting a broadband STS-n signal assembled from the ATM cells. In a further embodiment, the cell assemblers each comprise a parallel-to-serial converter connected to a respective one of the inputs of the cell assembler output multiplexer. In an embodiment, the cell framer controller is also connected to the cell assembler output multiplexer to synchronize the output broadband STS-n signal assembled from the ATM cells.

In a further embodiment, the cell assembler output multiplexer further includes an additional input connected to receive a narrowband STS which does not carry any ATM cells. In this embodiment, the cell assembler output multiplexer is capable of multiplexing the narrowband STS with the broadband STS-n signal generated by the cell assemblers if the broadband STS-n signal carrying the ATM cells does not occupy the entire bandwidth of a SONET frame.

In an embodiment in which the SONET frame is divided into twelve equal bandwidth portions capable of carrying a payload of up to twelve STS-1 signals, four STS-3c signals or one STS-12c signal, five cell delineators and five cell assemblers are provided in the cell framer according to the present invention to form a broadband STS-n signal, wherein n is an integer in the range of 1 to 12 with a granularity of one. In an embodiment, each of the cell delineators is capable of delineating a broadband STS selected from the group consisting of a broadband STS-1, a broadband STS-3c and a broadband STS-12c. The broadband STS-n signal may be a combination of a plurality of broadband STS-1 and STS-3c signals. A broadband STS-12c signal completely occupies the entire bandwidth of a SONET frame.

Advantageously, the present invention provides STS-n with enhanced granularity which allows efficient utilization of the SONET bandwidth for transporting ATM cells in the form of broadband STS-n signals even though the ATM data carried within each SONET frame may not fit exactly within a single broadband STS-1, a single broadband STS-3c, or a single broadband STS-12c. Furthermore, a broadband STS-n signal for carrying the ATM payload and conventional narrowband STS-1 signals may share the SONET bandwidth of a SONET frame if the broadband STS-n signal does not occupy the entire SONET bandwidth.

Furthermore, enhanced granularity for a broadband STS-n signal which carries an ATM payload for transmission over the SONET can be achieved by using a plurality of cell delineators and cell assemblers which are capable of processing broadband STS-1, STS-3c and STS-12c signals, thereby simplifying the hardware design for the cell framer which extracts ATM cells from broadband STS-n signals and assembles ATM cells to form STS-n signals.

BRIEF DESCRIPTION OF THE DRAWINGS

The present invention will be described with respect to particular embodiments thereof, and references will be made to the drawings in which.

DETAILED DESCRIPTION

Figure 1:
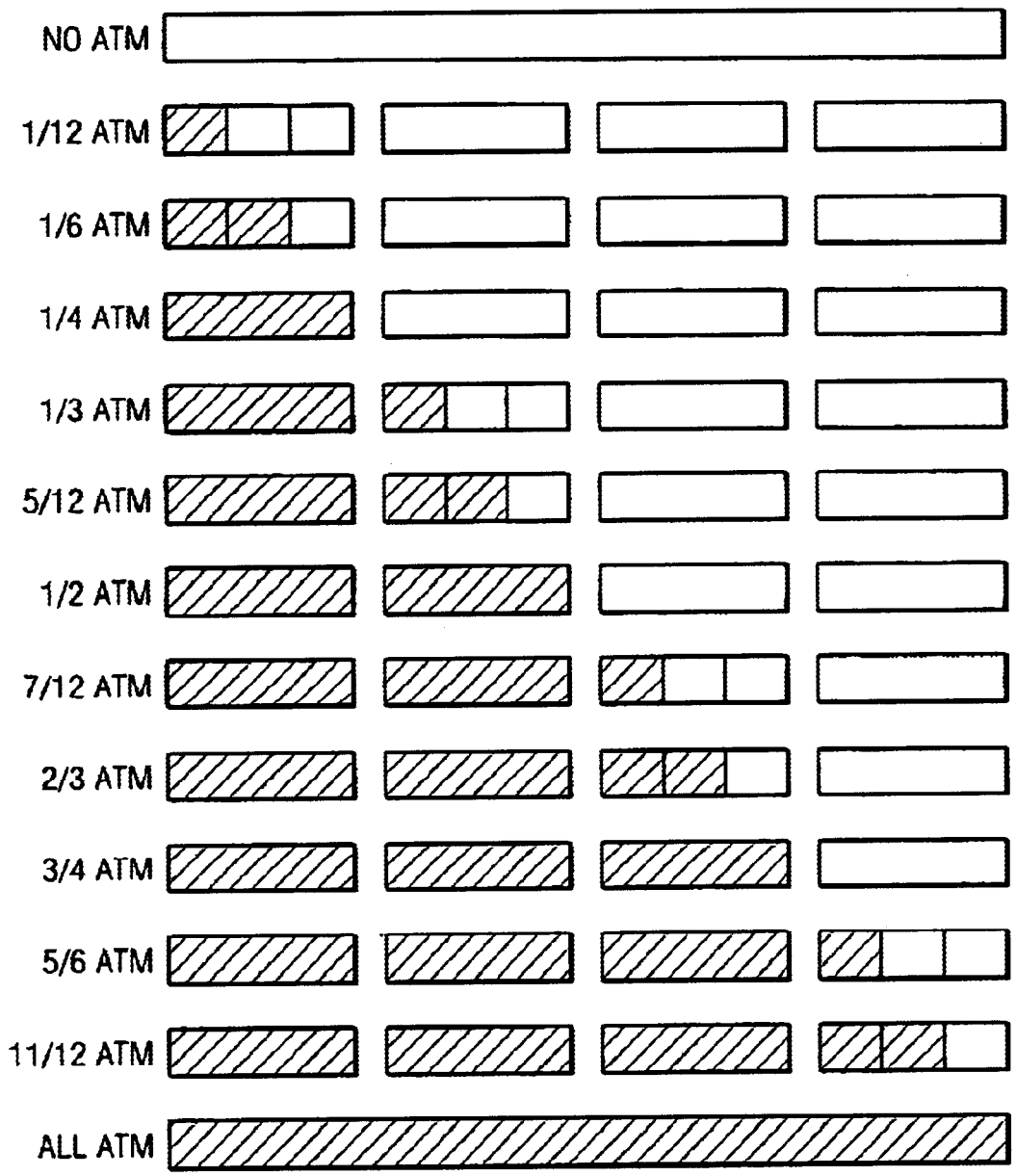
FIG. 1 shows a diagram of bandwidth allocation for carrying ATM data in the form of a broadband STS-n signal within a synchronous payload envelope (SPE) in an embodiment according to the present invention.

FIG. 1 shows a diagram illustrating bandwidth allocation for an asynchronous transfer mode (ATM) cell framer in an embodiment according to the present invention. A temporal frame, such as a synchronous optical network (SONET) frame which defines a synchronous payload envelope (SPE), is divided into twelve equal bandwidth portions capable of carrying up to twelve synchronous transport signal-level 1 (STS-1) signals, or four concatenated synchronous transport signal-level 3 (STS-3c) signals, or a single concatenated synchronous transport signal-level 12 (STS-12c) signal. As shown in FIG. 1, some of the bandwidth portions are allocated for carrying ATM data whereas other bandwidth portions not allocated for carrying ATM data are available for use for transporting conventional narrowband STS.

In an embodiment, ATM cells are assembled to form a broadband STS-n signal which is allocated to some or all of the SONET bandwidth portions for transporting the ATM cells, depending upon the size of ATM payload that need be carried within the SONET frame. In the embodiment shown in FIG. 1, ATM payload in the form of a broadband STS-n signal is allocated to the SONET bandwidth portions in increments of one bandwidth portion from 0 to 12. The shaded bandwidth portions as illustrated in FIG. 1 are allocated for transporting ATM cells in the form of a broadband STS-n signal, whereas the remaining bandwidth portions not allocated for transporting the ATM cells are used for transporting a conventional narrowband STS, for example, one or more narrowband STS-1 signals which are not used for carrying ATM data.

In the embodiment illustrated in FIG. 1, the broadband STS for carrying the ATM payload within the SONET frame is a broadband STS-n signal, wherein n can be any integer between 0 and 12. The fraction of the SONET bandwidth allocated for carrying the ATM payload depends upon the number n of the broadband STS-n signal. For example, if 5/12 of the cell framer bandwidth of a SONET frame is allocated for carrying the ATM payload, then the ATM payload is transported in the form of a broadband STS which is defined as a broadband STS-5 signal. Similarly, if 5/6 of the cell framer bandwidth of a SONET frame is allocated for carrying the ATM payload, then the ATM payload is transported in the form of a broadband STS which is defined as a broadband STS-10 signal.

In an embodiment, the broadband STS-n signal for carrying ATM payload data within a SONET frame, wherein the integer n is in the range of 1 to 12 with a granularity of 1, is formed as a combination of one or more broadband STS-1 or STS-3c signals, or as a single STS-12c signal for compatibility with standard STS formats. In an embodiment, three broadband STS-1 signals are received as a single broadband STS-3c signal, which requires only one cell delineator in an ATM cell framer which will be described in detail below. Each broadband STS-1 signal which is not combinable with two other broadband STS-1 signals to form a single broadband STS-3c signal requires a separate cell delineator in the ATM cell framer. In an embodiment in which a broadband STS for carrying ATM payload data occupies the entire cell framer bandwidth of a SONET frame, the broadband STS is received as a single STS-12c signal, which requires only one cell delineator in the ATM cell framer.

Figure 2:
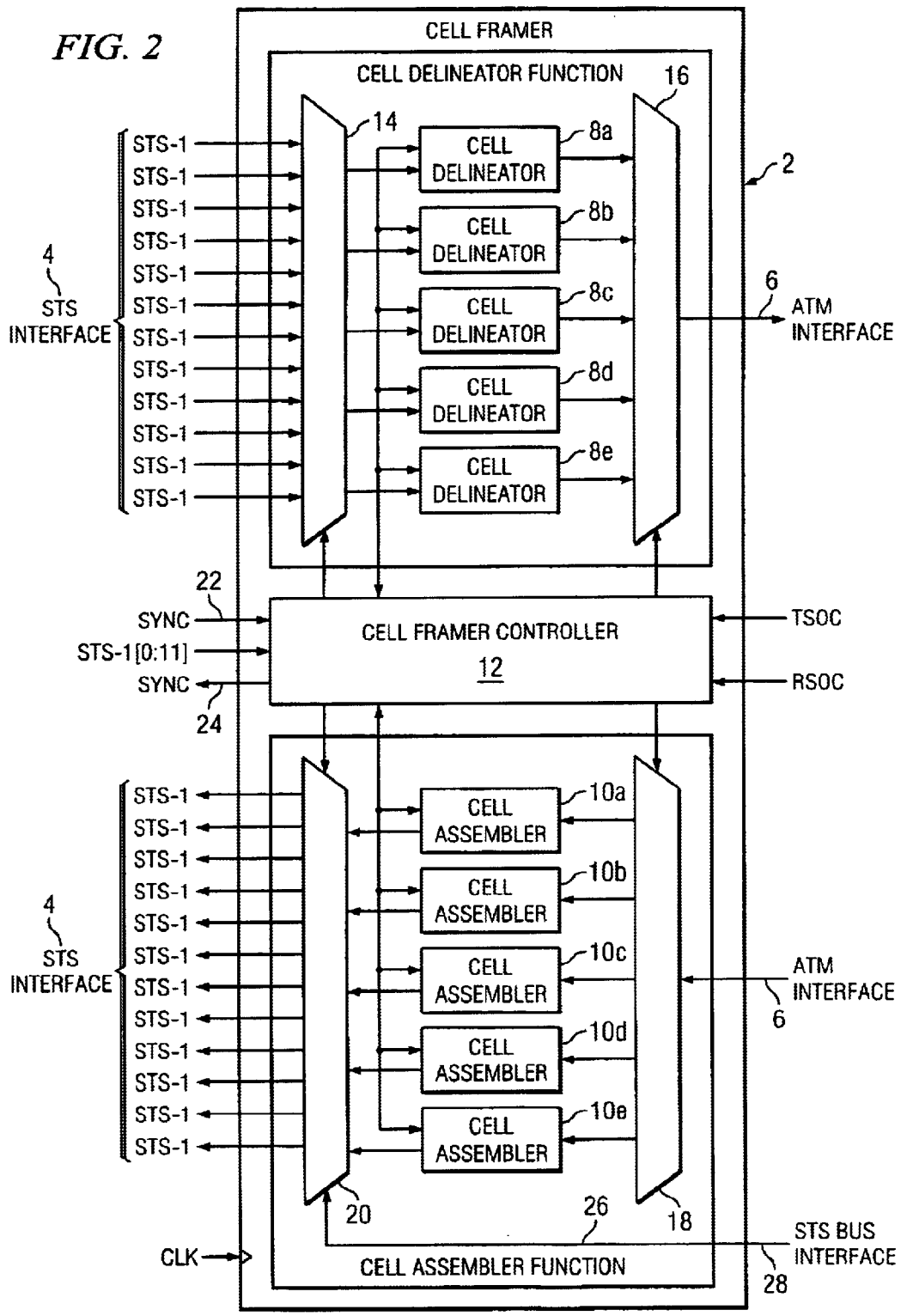
FIG. 2 shows a block diagram of an embodiment of an ATM cell framer to provide STS-n with enhanced granularity according to the present invention.

FIG. 2 shows a block diagram of an embodiment of an ATM cell framer for delineating and assembling ATM cells to provide broadband STS-n signals with enhanced granularity according to the present invention. As shown in FIG. 2, the cell framer 2 is capable of performing duplex functions of cell delineation and cell assembly between an STS interface 4 and an ATM physical layer interface 6. The cell delineation function is performed by five cell delineators 8a, 8b, 8c, 8d and 8e, while the cell assembly function is performed by five cell assemblers 10a, 10b, 10c, 10d and 10e.

The ATM cell framer according to the present invention further comprises a cell framer controller 12 which is connected to the cell delineators 8a, 8b, . . . 8e and the cell assemblers 10a, 10b, . . . 10e. The cell framer controller 12 provides synchronization for the broadband STS-n signal which carries broadband ATM payload data within the SONET bandwidth. The cell framer controller 12 provides STS synchronization to the cell delineators 8a, 8b, . . . 8e to extract ATM cells from a broadband STS-n signal received from the STS interface 4, and to the cell assemblers 10a, 10b, . . . 10e to assemble ATM cells received from the ATM interface 6 to form a broadband STS-n signal.

In an embodiment, the ATM cell framer according to the present invention further comprises a cell delineator input multiplexer 14 having an STS-n input, which is shown as twelve broadband STS-1 inputs for receiving a broadband STS-n signal from the STS interface 4. The cell delineators 8a, 8b, . . . 8e have a plurality of STS cell delineator inputs, a plurality of cell delineator framer control inputs and a plurality of cell delineator outputs. The cell delineator input multiplexer 14 has a plurality of outputs connected to the STS cell delineator inputs, respectively. After each of the cell delineators receives a broadband STS, it converts the serial STS data of the broadband STS into a parallel data format for header delineation, payload descrambling and error checking functions. The cell delineator framer control input of each of the cell delineators receives a synchronization signal from the cell framer controller 12 for synchronizing a frame counter in the cell delineator. An embodiment of the cell delineators will be described in further detail below with reference to FIG. 3.

Referring to FIG. 2, the ATM cell framer according to the present invention further comprises a cell delineator output multiplexer 16 in an embodiment to generate an output ATM data stream which is transmitted to the ATM physical layer interface 6. The cell delineator output multiplexer 16 has a plurality of inputs connected to the cell delineator outputs which transfer the ATM cells extracted by the cell delineators 8a, 8b, . . . 8e from the broadband STS-n signal received from the STS interface 4.

In an embodiment, the cell assemblers 10a, 10b, . . . 10e have a plurality of cell assemblers inputs, a plurality of cell assembler framer control inputs and a plurality of cell assembler outputs. The cell framer controller 12 is connected to the cell assembler framer control inputs of the cell assemblers 10a, 10b, . . . 10e. In an embodiment, the ATM cell framer according to the present invention further comprises a cell assembler input multiplexer 18 which has an input connected to the ATM physical layer interface 6 and a plurality of outputs connected to the cell assembler inputs. The cell assembler input multiplexer 18 receives an input ATM data stream comprising a plurality of ATM cells from the ATM physical layer interface 6 and transmits the ATM cells to one or more of the cell assemblers 10a, 10b, . . . 10e, depending upon the number of bandwidth portions of the SONET frame allocated for transporting the broadband STS-n signal assembled by the cell assemblers.

In an embodiment, the ATM cell framer according to the present invention further comprises a cell assembler output multiplexer 20 having a plurality of inputs connected to the cell assembler outputs, respectively, and an STS output capable of outputting a broadband STS-n signal assembled by the cell assemblers 10a, 10b, . . . 10e from the ATM cells received from the ATM physical layer interface 6. The STS output of the cell assembler output multiplexer 20 is shown in FIG. 2 as twelve STS-1 outputs connected to the STS interface 4. The broadband STS generated by each of the cell assemblers 10a, 10b, . . . 10e is converted from a parallel data format into a serial STS data format. An embodiment of the cell assemblers will be described in further detail below with reference to FIG. 6.

In addition to providing synchronization signals to the cell delineators 8a, 8b, . . . 8e and the cell assemblers 10a, 10b, . . . 10e for the broadband STS-n signals, the cell framer controller 12 is also connected to the cell delineator input multiplexer 14, the cell delineator output multiplexer 16, the cell assembler input multiplexer 18 and the cell assembler output multiplexer 20 in an embodiment to provide frame synchronization for the STS-n signals as well as transmit and receive starter cell signals for the input and output ATM data streams. In an embodiment, the cell framer controller has an STS synchronization input 22 which carries an STS synchronization signal for the STS-n signal received by the cell delineator input multiplexer 14 from the STS interface 4.

Some of the STS inputs to the cell delineator input multiplexer 14 may receive broadband STS carrying ATM data while others may receive conventional narrowband STS carrying no ATM data. It is also possible that all of the STS inputs to the cell delineator input multiplexer 14 carry broadband STS, such as a broadband STS-12c signal, or carry no ATM data at all. In an embodiment, a serial input STS-1 [0:11] is provided to the cell framer controller 12 to indicate to the cell framer controller the amount of bandwidth portions of a SONET frame allocated for ATM traffic in the form of a broadband STS-n signal. The serial input STS-1 [0:11] may be provided by the STS interface 4 which transmits the broadband STS-n signal to the cell delineator input multiplexer 14. In an embodiment, the cell framer controller 12 audits incoming payload pointers of the received broadband STS to determine whether the STS is concatenated. The contents of the payload pointers determine the routing of the broadband STS and the number of cell delineators or cell assemblers utilized.

In an embodiment, the broadband STS-n signal for carrying ATM cells is capable of occupying the SONET bandwidth in small incremental portions. Referring to FIG. 1, the SONET bandwidth is divided into twelve equal bandwidth portions, and the broadband STS-n signal for carrying AIM payload data may occupy any integral number of the twelve SONET bandwidth portions. In an embodiment in which the cell delineators 8a, 8b, . . . 8e as shown in FIG. 2 comprise conventional cell delineators each only capable of delineating a broadband STS-1 signal, a broadband STS-3c signal, or a broadband STS-12c signal, the STS-n signal received from the STS interface is regarded as a combination of one or more STS-1 signals or STS-3c signals. If the broadband STS received from the STS interface occupies the entire SONET bandwidth, it is regarded as a broadband STS-12c signal.

When some but not all of the bandwidth portions within a SONET frame are allocated for ATM traffic, one or more of the cell delineators in the cell framer as shown in FIG. 2 may be required to extract ATM payload data from the input STS-n signal. Referring to FIG. 1, if the broadband STS carrying ATM payload data occupies only $\frac{1}{12}$ of the SONET bandwidth, only one of the five cell delineators 8a, 8b, . . . 8e in the cell framer as shown in FIG. 2 is required to extract ATM data from the broadband STS-1 signal occupying $\frac{1}{12}$ of the SONET bandwidth. If a broadband STS-2 signal for carrying ATM payload data occupies $\frac{1}{6}$ of the SONET bandwidth, two of the five cell delineators 8a, 8b, . . . 8e in the cell framer as shown in FIG. 2 are required to delineate the STS-2 signal, which is regarded as a combination of two broadband STS-1 signals.

If the broadband STS occupies $\frac{1}{4}$ of the SONET bandwidth, that is, three of the twelve SONET bandwidth portions for carrying ATM traffic, the broadband STS is received as a single broadband STS-3c signal instead of three separate broadband STS-1 signals. A single broadband STS-3c signal requires only one cell delineator for extracting the ATM cells instead of three cell delineators. If the broadband STS for carrying ATM traffic occupies one-third of the SONET bandwidth, that is, four of the twelve SONET bandwidth portions, the broadband STS-4 signal is received as a combination of a single broadband STS-3c signal and a single broadband STS-1 signal. In this case, two of the five cell delineators 8a, 8b, . . . 8e as shown in FIG. 2 are required for the cell delineation of the broadband STS-3c and the broadband STS-1.

If the broadband STS for carrying ATM traffic occupies $\frac{5}{12}$ of the SONET bandwidth, the broadband STS-5 signal is received as a combination of a single broadband STS-3c signal and two individual broadband STS-1 signals. In this case, three cell delineators are required for extracting the ATM cells from the broadband STS. One cell delineator is required for the cell delineation of the broadband STS-3c signal and two additional cell delineators are required for the cell delineation of the two individual broadband STS-1 signals. If the broadband STS occupies $\frac{1}{2}$ of the SONET bandwidth, that is, six of the twelve SONET bandwidth portions, the broadband STS-6 signal is received as a combination of two broadband STS-3c signals, which require two cell delineators to extract ATM cells from the broadband STS-3c signals.

If the broadband STS for carrying ATM traffic occupies $\frac{7}{12}$ of the SONET bandwidth, the broadband STS is received as a combination of two broadband STS-3c signals and one broadband STS-1 signal. In this case, three cell delineators are required for extracting the ATM cells from the broadband STS. Two cell delineators are required for the cell delineation of the two broadband STS-3c signals and one additional cell delineator is required for the cell delineation of the broadband STS-1 signal.

In a similar manner, four cell delineators are required for extracting ATM cells from a broadband STS which occupies $\frac{2}{3}$ of the SONET bandwidth, that is, eight of the twelve SONET bandwidth portions within the SONET frame. The broadband STS-8 signal is received as a combination of two broadband STS-3c signals and two broadband STS-1 signals. If the broadband STS for carrying ATM traffic occupies $\frac{3}{4}$ of the SONET bandwidth, the broadband STS is received as a combination of three STS-3c signals which require three cell delineators for the extraction of ATM cells.

If the broadband STS for carrying AIM traffic occupies $\frac{5}{6}$ the SONET bandwidth, that is, ten of the twelve SONET bandwidth portions within the SONET frame, the broadband STS-10 signal is received as a combination of three broadband STS-3c signals and a single broadband STS-1 signal. AIM cells are extracted from the broadband STS by using four cell delineators, three of which for delineating the three broadband STS-3c signals and one of which for delineating the broadband STS-1 signal. Therefore, when a broadband STS-n signal carrying ATM traffic is delineated with enhanced granularity, wherein n is an integer in the range of 1 to 10 in increments of 1, ATM cell delineation requires no more than four cell delineators if the broadband STS-n signal is received as one or more broadband STS-1 or STS-3c signals, or a combination thereof.

If the broadband STS for carrying ATM traffic occupies $\frac{11}{12}$ of the SONET bandwidth, that is, eleven of the twelve SONET bandwidth portions, the broadband STS-11 signal is received as a combination of three broadband STS-3c signals and two broadband STS-1 signals. In this situation, all of the five cell delineators 8a, 8b, . . . 8e as shown in FIG. 2 are required for extracting the ATM cells from the broadband STS. If the broadband STS for carrying ATM traffic occupies the entire SONET bandwidth, only one of the five cell delineators as shown in FIG. 2 is required for extracting ATM cells from the broadband STS, which is received as a single broadband STS-12c signal. Therefore, in an embodiment in which the integer n of the broadband STS-n signal is in the range of 1 to 12 with a granularity of one, no more than five cell delineators are required in the ATM cell framer.

Referring to FIG. 2, the cell framer controller 12 is also connected to the cell assembler output multiplexer 20 to synchronize the output broadband STS generated by the cell assemblers 10a, 10b, . . . 10e. The cell framer controller 12 has an STS synchronization output 24 which carries a synchronization signal for the broadband STS transmitted to the STS interface 4. In an embodiment, the cell assembler output multiplexer 20 further includes an additional input 26 for receiving a narrowband STS, for example, one or more narrowband STS-1 signals carrying no ATM traffic, from an STS bus interface 28. In this embodiment, the cell assembler output multiplexer 20 is further capable of multiplexing the narrowband STS with the broadband STS assembled from the ATM cells by the cell assemblers 10a, 10b, . . . 10e. If the broadband STS for carrying ATM traffic does not occupy the entire SONET bandwidth, the bandwidth not occupied by the broadband STS within a SONET frame is available for carrying conventional narrowband STS traffic.

In the embodiment shown in FIG. 2, the cell framer controller 12 is also connected to the cell delineator output multiplexer 16, which receives the extracted ATM cells from the cell delineators 8a, 8b, . . . 8e and transmits an ATM data stream to the ATM physical layer interface 6. A transmit starter cell signal TSOC is provided to the cell framer controller 12 which signifies to the cell delineator output multiplexer 16 to initiate the generation of the output ATM data stream. In an embodiment, the cell framer controller 12 is also connected to the cell assembler input multiplexer 18, which receives an input ATM data stream from the ATM physical layer interface 6. A receive starter cell signal RSOC is provided to the cell framer controller 12, which signifies to the cell assembler input multiplexer 18 to transmit the ATM cells to one or more of the cell assemblers 10a, 10b, . . . 10e depending upon the fraction of the SONET bandwidth required for carrying ATM traffic.

Figure 3:
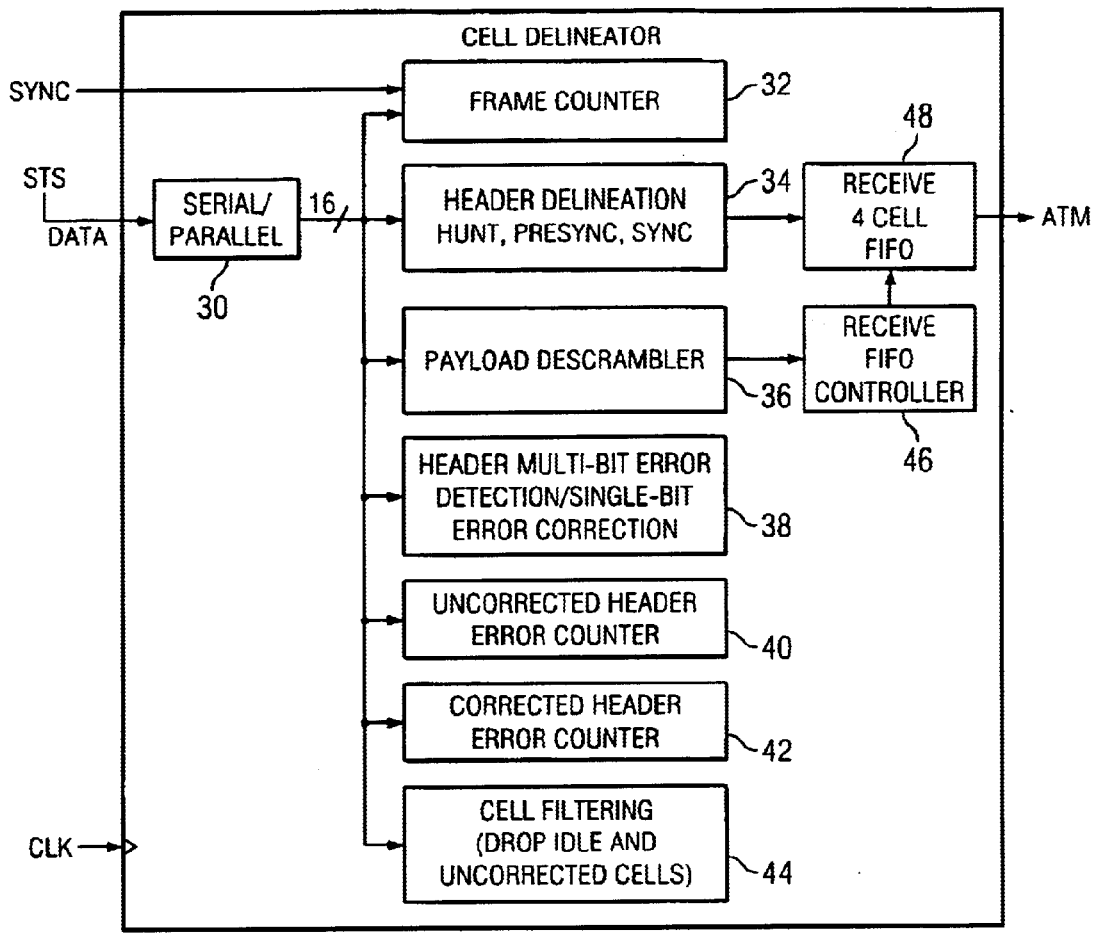
FIG. 3 shows a block diagram of an embodiment of a cell delineator in the cell framer according to the present invention.

FIG. 3 shows a block diagram of an embodiment of any given one of the cell delineators 8a, 8b, . . . 8e in the cell framer of FIG. 2. In the embodiment shown in FIG. 3, a serial-to-parallel converter 30 is provided in the cell delineator to receive broadband STS data from the STS interface. In an embodiment, the serial-to-parallel converter in each of the cell delineators is connected to receive the STS data from a respective one of the outputs of the cell delineator input multiplexer 14 as shown in FIG. 2. In an embodiment, the serial-to-parallel converter 30 in the cell delineator as shown in FIG. 3 has a parallel 16-bit output which carries the STS data for the delineation of ATM cells.

In FIG. 3, a frame counter 32 is provided in the cell delineator with an input for receiving the parallel STS data from the serial-to-parallel converter 30 and another input to receive an input STS synchronization signal SYNC from the cell framer controller 12 as shown in FIG. 2. In the embodiment shown in FIG. 3, the cell delineator further comprises a header delineator 34, an ATM payload descrambler 36, a header multi-bit error detector which is capable of single-bit error correction 38, an uncorrected header error counter 40, a corrected header error counter 42 and a cell filter 44 for dropping idle and uncorrected cells. Header error detection and correction for an ATM cell may be performed in a conventional manner and known to a person skilled in the art.

In an embodiment, the header delineator 34 performs header delineation for an ATM cell using a cell delineation algorithm which searches all fifty-three possible cell boundary candidates one at a time to determine the valid cell boundary location. An embodiment of a cell delineation technique will be described in further detail below with reference to the cell delineation state diagram of FIG. 4 and the header check sequence (HCS) verification state diagram of FIG. 5.

Referring to FIG. 3, after the ATM cell header is delineated by the header delineator 34, the header field of the ATM cell is transferred to an output buffer 46. In an embodiment, the output buffer 46 of the cell delineator comprises a receive first-in-first-out (FIFO) buffer memory which is controlled by a receive FIFO controller 48. In an embodiment, the receive FIFO buffer memory 46 is capable of storing up to four ATM cells and generates an output ATM data stream which is transferred the AIM physical layer interface. In an embodiment, the FIFO buffer memory of each of the cell delineators is connected to the cell delineator output multiplexer 16 as shown in FIG. 2.

Referring to FIG. 3, the ATM payload descrambler 36 in the cell delineator receives parallel STS data from the serial-to-parallel converter 30 and descrambles the data to generate the payload bytes of an ATM cell. In an embodiment, the ATM payload descrambler 36 comprises a self-synchronous descrambler which operates on a 48-octet ATM cell payload. In an embodiment, the payload descrambler 36 descrambles the information field carrying the payload data using a polynomial $x^{43}+1$. Because the payload bytes follow the header bytes in a typical ATM cell, the ATM payload descrambler 36 is disabled for the duration of the header and HCS fields. The receive FIFO buffer memory 46 receives the delineated ATM cell header bytes from the header delineator 34 followed in sequence by the descrambled ATM payload bytes received from the payload descrambler 36 for a given ATM cell.

Figure 4:
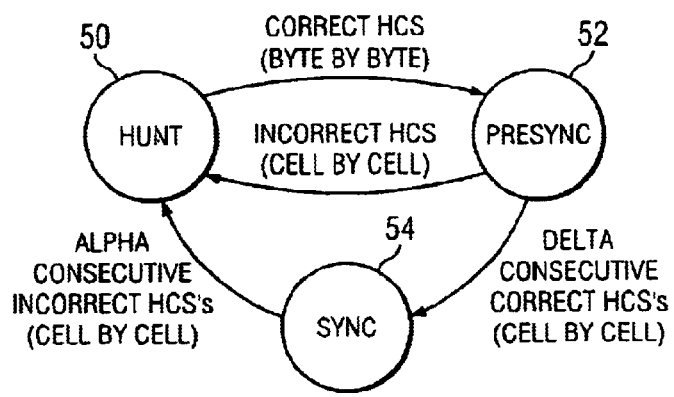
FIG. 4 shows an embodiment of a cell delineation state diagram for the cell delineator of FIG. 3.

FIG. 4 shows an embodiment of a cell delineation state diagram illustrating a delineation process performed by the cell delineator as shown in FIG. 3. Cell delineation is a process of framing the boundaries of an ATM cell by using the header check sequence (HCS) field found in the ATM cell header. A calculation process using a cyclic redundancy code-8 (CRC-8) is performed on the HCS field over the first four octets of the ATM cell header. The cell boundaries of the ATM cell are indicated by valid HCS calculations.

In an embodiment, a cell delineation algorithm searches all of the fifty-three possible cell boundary candidates one at a time to determine the valid cell boundary location. When the cell delineator is searching for the cell boundary location, the header delineator 34 is said to be in a HUNT state 50 as shown in FIG. 4. When a correct HCS is found, a state machine in the-header delineator 34 locks on the cell boundary indicated by the HCS and the cell delineator enters a PRESYNC state 52. The PRESYNC state 52 validates the cell boundary location.

If the cell boundary is invalid, then an incorrect HCS will be received within the next DELTA cells, at which point a transition back to the HUNT state 50 is executed. If no errors are detected within the HCS field when the cell delineator is in the PRESYNC state 52, the cell delineator then enters a SYNC state 54. While the cell delineator is in the SYNC state 54, synchronization is maintained until ALPHA consecutive incorrect HCS patterns are detected. In such an event, the cell delineator makes a transition back to the HUNT state 50.

Figure 5:
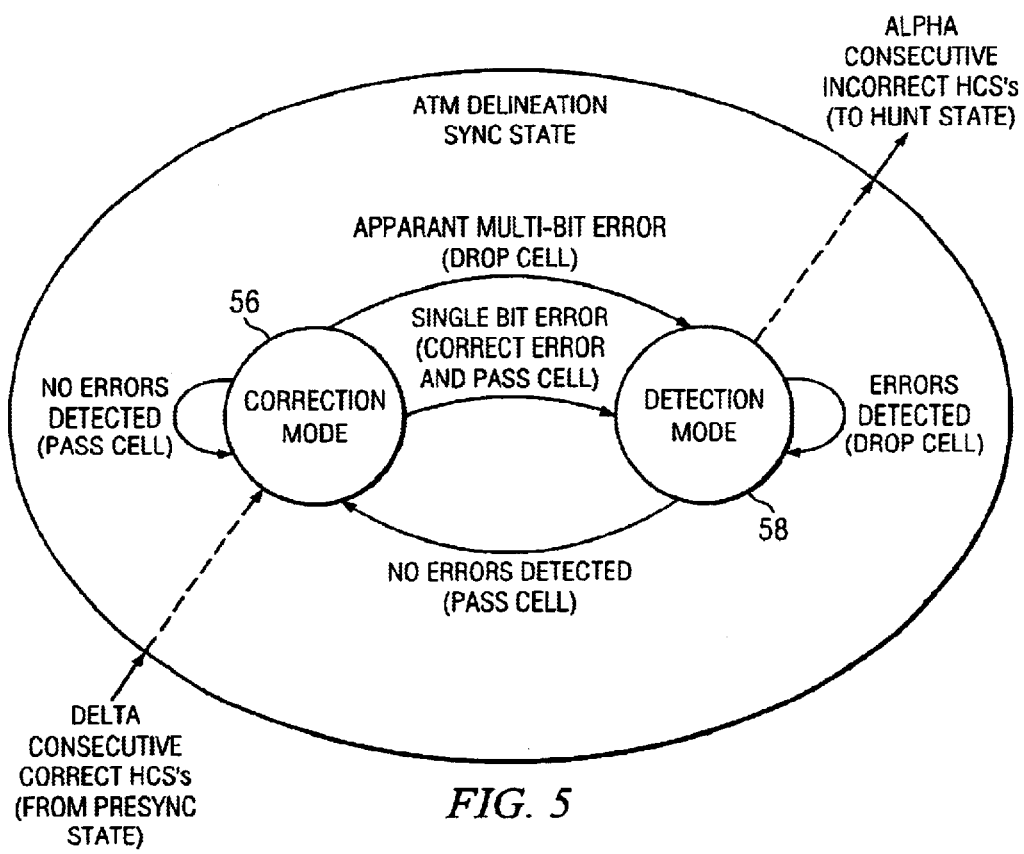
FIG. 5 shows an embodiment of a state diagram for header check sequence (HCS) verification performed by the cell delineator of FIG. 3.

FIG. 5 shows an embodiment of an HCS verification state diagram for cell filtering when the cell delineator is in the SYNC state. ATIM cells are filtered or dropped based upon HCS errors. ATM cells are passed to the receive FIFO buffer memory 46 as shown in FIG. 3 while the cell delineator is in the SYNC state. When error checking for the HCS is enabled, ATM cells are dropped if uncorrectable HCS errors are detected. In an embodiment, idle or unassigned cells are assumed to contain all zeroes in the fields for the virtual channel indicator (VCI) and the virtual path identifier (VPI). In an embodiment, idle or unassigned cells are dropped upon detecting all zeroes in the fields for the VCI and the VPI.

In an embodiment, the calculation process for the HCS includes a CRC-8 calculation over the first four octets of the ATM cell header. The HCS received by the header delineator is verified by using a polynomial $x^8+x^2+x+1$. A coset polynomial $x^6+x^4+x^2+1$ is added (modulo 2) to the received HCS octets before comparison with the result of the CRC-8 calculation. While the cell delineator is in the SYNC state, an HCS verification circuit in the cell delineator implements the HCS verification state diagram as shown in FIG. 5 in an embodiment.

During normal operations, the HCS verification state machine remains in a correction mode state 56. Incoming ATM cells containing no HCS errors are passed to the receive FIFO buffer memory 46 as shown in FIG. 3. In an embodiment, incoming single-bit errors are corrected to generate a corrected ATM cell, which is passed to the receive FIFO buffer memory 46 in FIG. 3. Referring to FIG. 5, the HCS verification state machine enters a detection mode state 58 upon detecting an error, which could be either a single-bit error or a multi-bit error. While the HCS verification state machine is in the detection mode state 58, detection of any HCS error causes the corresponding ATM cell to be dropped. If the HCS verification state machine does not detect any error in the HCS, the cell delineator makes a transition back to the correction mode state 56.

In an embodiment, correctable HCS errors consisting of single-bit errors are detected while the HCS verification state machine is in the correction mode state 56. In an embodiment, an 8-bit saturating counter counts the number of corrected single-bit HCS errors. The saturating counter is enabled only when the cell delineator is in the SYNC state and is reset to zero when read. After the single-bit HCS errors are corrected when the HCS verification state machine is in the correction mode state 56, the resulting ATM cell with corrected bits is passed to the receive FIFO buffer memory 46 as shown in FIG. 3 while the HCS verification state machine enters the detection mode state 58 as shown in FIG. 5.

Single-bit errors detected in the correction mode state 56 must be corrected while still in the correction mode state. Single-bit HCS errors detected while the HCS verification state machine is in the detection mode state 58 become uncorrectable HCS errors. If multi-bit HCS errors are detected while the HCS verification state machine is in the correction mode state 56, the state machine also enters the detection mode state 58. If uncorrected single-bit HCS errors are detected while the state machine is in the detection mode state 58, an additional 8-bit saturating counter counts the number of uncorrected single-bit HCS errors in an embodiment. The saturating counter is enabled only when the cell delineator is in the SYNC state and is reset to zero when read.

In the embodiment shown in FIG. 3, the receive FIFO buffer memory 46 in the cell delineator is capable of accommodating up to four ATM cells. The FIFO buffer memory 46 is controlled by the receive FIFO controller 48, which performs management functions such as filling the FIFO buffer memory 46 and indicating when ATM cells are available to be read. In an embodiment, the receive FIFO controller 48 is also capable of maintaining FIFO read and write pointers and detecting FIFO overrun and underrun conditions.

In an embodiment, if an overrun condition is detected, the FIFO buffer memory 46 drops all incoming cells until at least one of the ATM cells has been read from the FIFO buffer memory 46 by the ATM physical layer interface. In this situation, at least one ATM cell will be lost during the FIFO drop operation. When an underrun condition is detected, the offending reading operation sought to be performed by the ATM physical layer interface is ignored by the FIFO buffer memory 46. In an embodiment, a FIFO overrun condition is indicated through a maskable interrupt and register bit.

Figure 6:
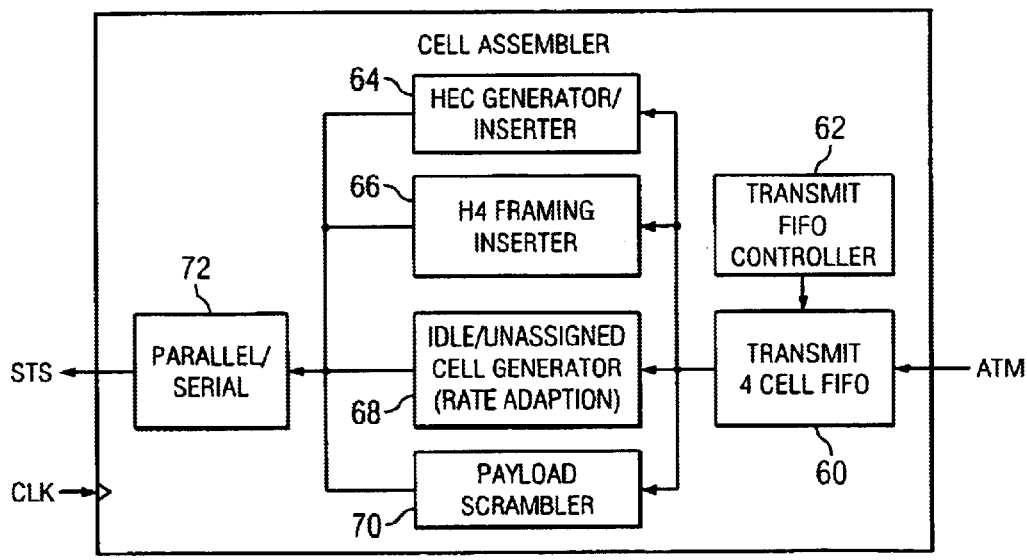
FIG. 6 shows a block diagram of an embodiment of a cell assembler in the cell framer according to the present invention.

FIG. 6 shows a block diagram of an embodiment of any given one of the cell assemblers 10a, 10b, . . . 10e in the cell framer of FIG. 2. Referring to FIG. 6, a cell assembler buffer 60 is provided in the cell assembler to receive ATM cells from the ATM physical layer interface. In an embodiment, the cell assembler buffer 60 comprises a four-cell transmit FIFO buffer memory which is capable of storing up to four ATM cells. In a further embodiment, a transmit FIFO controller 62 is connected to the FIFO buffer memory 60 in the cell assembler. In an embodiment, the FIFO buffer memory within each of the cell assemblers 10a, 10b, . . . 10e is connected to the outputs of the cell assembler input multiplexer 18 as shown in FIG. 2.

Referring to FIG. 6, the transmit FIFO buffer memory 60 is connected to a header error check (HEC) generator/inserter 64, an H4 framing inserter 66, an idle/unassigned cell generator 68, and an ATM payload scrambler 70. In an embodiment, the HEC generator/inserter 54 performs a CRC-8 calculation over the first four header octets of an ATM cell received from the FIFO buffer memory 60. A parallel implementation of the polynomial $x^8+x^2+x+1$ is used in the CRC-8 calculation. The coset polynomial $x^6+x^4+x^2+1$ is added (modulo 2) to the residue of the CRC-8 calculation to generate a result which is inserted into the fifth octet of the ATM header.

In the H4 framing inserter 66, the H4 mapping specific indicator octet is inserted into the ATM cell stream in a conventional manner known to a person skilled in the art. The ATM payload scrambler 70 performs a scrambling operation on the 48-octet payload information field of an ATM cell while the ATM cell header field is transmitted and unscrambled. Payload scrambling may be performed on the payload data bytes of a typical ATM cell in a conventional manner known to a person skilled in the art.

When the idle/unassigned cell generator 68 is activated, an idle or unassigned ATM cell is inserted into the ATM cell stream. In an embodiment, registers are provided within the idle/unassigned cell generator 68 to program the fields for the generic flow control (GFC), the payload type identifier (PTI), and the cell loss priority (CLP) of the idle cell header and the idle cell payload. A pattern of all zeroes is inserted into the fields for the VCI and the VPI of an idle ATM cell. The HCS for the idle ATM cell is automatically calculated and inserted.

In an embodiment, the cell assembler further comprises a parallel-to-serial converter 72 connected to the HEC generator/inserter 64, the H4 framing inserter 66, the idle/unassigned cell generator 68, and the ATM payload scrambler 70. The parallel-to-serial converter 72 converts scrambled ATM data into a serial STS data format for transmission to the STS interface. In an embodiment, the parallel-to-serial converter in each of the cell assemblers 10a, 10b, . . . 10e is connected to a respective one of the inputs of the cell assembler output multiplexer 20 as shown in FIG. 2.

In an embodiment, an idle or unassigned ATM cell is generated and transmitted by the idle/unassigned cell generator 68 to the parallel-to-serial converter 72 in the cell assembler if a complete ATM cell has not been received from the ATM physical layer interface and written to the transmit FIFO buffer memory 60. In an embodiment, the transmit FIFO buffer memory 60 as shown in FIG. 6 is capable of accommodating up to four ATM cells received from the ATM physical layer interface.

Management functions performed by the transmit FIFO controller 62 include filling the transmit FIFO buffer memory 60, indicating when ATM cells are available to be written to the FIFO buffer memory 60, maintaining the read and write pointers for the transmit FIFO buffer memory 60, and detecting an FIFO overrun condition. An FIFO overrun condition occurs when the ATM physical layer interface attempts to write an ATM cell into the FIFO buffer memory 60 when the buffer memory 60 already contains four ATM cells. In an embodiment, a maskable interrupt is generated by the transmit FIFO controller 62 when the FIFO overrun condition occurs. Attempts for further writing operations by the ATM physical layer interface to the FIFO buffer memory 60 in the cell assembler are ignored until there is memory available in the FIFO buffer memory 60 to receive an ATM cell.

The present invention has been described with respect to particular embodiments thereof, and numerous modifications can be made which are within the scope of the claims.

What is claimed is:

1. A method of allocating bandwidth for transporting asynchronous transfer mode (ATM) cells as a synchronous transport signal-n (STS-n) in a temporal frame, the method comprising the steps of:
   (a) dividing the temporal frame into a plurality of bandwidth portions;
   (b) assigning a first number of the bandwidth portions for transporting the ATM cells;
   (c) assigning a second number of the bandwidth portions for transporting a narrowband STS; and
   (d) wherein the temporal frame is divided into 12 equal bandwidth portions, wherein the first number is an integer, and wherein the second number is an integer.

2. The method of claims 1, wherein the first integer is between 0 and 12.

3. The method of claim 1, wherein the second integer is between 0 and 12.

4. The method of claim 1, wherein the first integer plus the second integer is equal to 12.

5. The method of claim 1, wherein a first ten of the bandwidth portions for transporting the ATM cells are delineated by four cell delineators, and wherein an eleventh bandwidth portion following the first ten bandwidth portions for transporting the ATM cells is delineated by a fifth cell delineator.

6. A method of allocating bandwidth for transporting asynchronous transfer mode (ATM) cells as a synchronous transport signal-n (STS-n) in a synchronous optical network (SONET) frame, the method comprising the steps of:
   (a) assigning 12 equal bandwidth portions to the SONET frame;
   (b) assigning a first integral number of the bandwidth portions for transporting at least one broadband STS;
   (c) assigning a second integral number of the bandwidth portions for transporting at least one narrowband STS; and
   (d) delineating the ATM cells from said at least one broadband STS.

7. The method of claim 6, wherein the first integral number is between 0 and 12.

8. The method of claim 6, wherein the second integral number is between 0 and 12.

9. The method of claim 6, wherein the first integral number plus the second integral number is equal to 12.

10. The method of claim 6, wherein a first ten of the bandwidth portions for transporting the ATM cells are delineated by four cell delineators, and wherein an eleventh bandwidth portion following the first ten bandwidth portions for transporting the ATM cells is delineated by a fifth cell delineator.

11. The method of claim 6, wherein the broadband STS is selected from the group consisting of STS-1, STS-3c and STS-12c.

12. The method of claim 6, wherein the broadband STS comprises a broadband STS-n signal, wherein n is an integer between 1 and 12.

13. The method of claim 6, further comprising the step of multiplexing said at least one broadband STS with said at least one narrowband STS within the SONET frame.

14. A method of framing asynchronous transfer mode (ATM) cells as a synchronous transport signal-n (STS-n) for transport within a synchronous optical network (SONET) frame, the method comprising the steps of:
   (a) assigning 12 equal bandwidth portions to the SONET frame;
   (b) receiving the ATM cells;
   (c) assembling the ATM cells to form at least one broadband STS;
   (d) assigning a first integral number of the bandwidth portions for transporting said at least one broadband STS;
   (e) assigning a second integral number of the bandwidth portions for transporting at least one narrowband STS;
   (f) multiplexing said at least one broadband STS with said at least one narrowband STS within the SONET frame; and
   (g) wherein a first ten of the bandwidth portions for transporting the ATM cells are delineated by four cell delineators, and wherein an eleventh bandwidth portion following the first ten bandwidth portions for transporting the ATM cells is delineated by a fifth cell delineator.

15. An asynchronous transfer mode (ATM) cell framer, comprising:
   (a) a plurality of cell delineators having a plurality of synchronous transport signal (STS) cell delineator inputs, a plurality of cell delineator framer control inputs and a plurality of cell delineator outputs capable of outputting a plurality of ATM cells;
   (b) a plurality of cell assemblers having a plurality of cell assembler inputs, a plurality of cell assembler framer control inputs and a plurality of cell assembler outputs; and
   (c) a cell framer controller, connected to the cell delineators and the cell assemblers, to provide synchronization to the cell delineators and to the cell assemblers.

16. The cell framer of claim 15, further comprising a cell delineator output multiplexer connected to the cell delineator outputs, to generate an output ATM data stream comprising the ATM cells extracted from at least one broadband STS.

17. The cell framer of claim 16, wherein each of the cell delineators comprises a cell delineator buffer connected to the cell delineator output multiplexer.

18. The Cell framer of claim 17, wherein the cell delineator buffer comprises a first-in-first-out (FIFO) buffer memory.

19. The cell framer of claim 16, wherein the cell framer controller is connected to the cell delineator output multiplexer.

20. The cell framer of claim 15, further comprising a cell assembler input multiplexer connected to the cell assembler inputs, the cell assembler input multiplexer capable of receiving an input ATM data stream comprising a plurality of ATM cells.

21. The cell framer of claim 20, wherein each of the cell assemblers comprises a cell assembler buffer connected to the cell assembler input multiplexer.

22. The cell framer of claim 21, wherein the cell assembler buffer comprises a first-in-first-out (FIFO) buffer memory.

23. The cell framer of claim 20, wherein the cell framer controller is connected to the cell assembler input multiplexer.

24. The cell framer of claim 15, further comprising a cell delineator input multiplexer having an STS-n input and a plurality of outputs connected to the cell delineator inputs respectively, wherein n is an integer between 1 and 12.

25. The cell framer of claim 24, wherein each of the cell delineators comprises a serial-to-parallel converter connected to a respective one of the outputs of the cell delineator input multiplexer.

26. The cell framer of claim 24, wherein the cell framer controller is connected to the cell delineator input multiplexer.

27. The cell framer of claim 15, further comprising a cell assembler output multiplexer having a plurality of inputs connected to the outputs of the cell assemblers respectively, and an STS output capable of outputting at least one broadband STS assembled from the ATM cells.

28. The cell framer of claim 27, wherein each of the cell assemblers comprises a parallel-to-serial converter connected to a respective one of the Inputs of the cell assembler output multiplexer.

29. The cell framer of claim 27, wherein the cell framer controller is connected to the cell assembler output multiplexer.

30. The cell framer of claim 27, wherein the cell assembler output multiplexer further includes an additional input connected to receive a narrowband STS, the cell assembler output multiplexer capable of multiplexing the narrowband STS with the broadband STS assembled from the ATM cells.

31. The cell framer of claim 15, wherein the cell delineators comprise five cell delineators wherein each of the cell delineators is capable of delineating a broadband STS selected from the group consisting of an STS-1, an STS-3c and an STS-12c.

32. An asynchronous transfer mode (ATM) cell framer, comprising:

(a) five cell delineators having a plurality of cell delineator inputs, a plurality of cell delineator framer control inputs and a plurality of cell delineator outputs, the cell delineator inputs capable of receiving broadband synchronous transport signal-n (STS-n) signals, wherein n is an integer between 1 and 12, the cell delineator outputs capable of outputting a plurality of ATM cells;

(b) five cell assemblers having a plurality of cell assembler inputs, a plurality of cell assembler framer control inputs and a plurality of cell assembler outputs; and (c) a cell framer controller, connected to the cell delineators and the cell assemblers, to provide synchronization to the cell delineators and to the cell assemblers.

33. The cell framer of claim 32, further comprising a cell delineator output multiplexer connected to the cell delineator outputs, to generate an output ATM data stream comprising the ATM cells extracted from the broadband STS-n signals.

34. The cell framer of claim 33, wherein each of the cell delineators comprises a cell delineator buffer connected to the cell delineator output multiplexer.

35. The cell framer of claim 34, wherein the cell delineator buffer comprises a first-in-first-out (FIFO) buffer memory.

36. The cell framer of claim 33, wherein the cell framer controller is connected to the cell delineator output multiplexer.

37. The cell framer of claim 32, further comprising a cell assembler input multiplexer connected to the cell assembler inputs, the cell assembler input multiplexer capable of receiving an input ATM data stream comprising a plurality of ATM cells.

38. The cell framer of claim 37, wherein each of the cell assemblers comprises a cell assembler buffer connected to the cell assembler input multiplexer.

39. The cell framer of claim 38, wherein the cell assembler buffer comprises a first-in-first-out (FIFO) buffer memory.

40. The cell framer of claim 37, wherein the cell framer controller is connected to the cell assembler input multiplexer.

41. The cell framer of claim 32, further comprising a cell delineator input multiplexer having an STS-n input and a plurality of outputs connected to the cell delineator inputs respectively, wherein n is an integer between 1 and 12.

42. The cell framer of claim 41, wherein each of the cell delineators comprises a serial-to-parallel converter connected to a respective one of the outputs of the cell delineator input multiplexer.

43. The cell framer of claim 41, wherein the cell framer controller is connected to the cell delineator input multiplexer.

44. The cell framer of claim 32, further comprising a cell assembler output multiplexer having a plurality of Inputs connected to the outputs of the cell assemblers respectively, and an STS output capable of outputting at least one broadband STS assembled from the ATM cells.

45. The cell framer of claim 44, wherein each of the cell assemblers comprises a parallel to serial converter connected to a respective one of the inputs of the cell assembler output multiplexer.

46. The cell framer of claim 44, wherein the cell framer controller is connected to the cell assembler output multiplexer.

47. The cell framer of claim 44, wherein the cell assembler output multiplexer further includes an additional input connected to receive a narrowband STS, the cell assembler output multiplexer capable of multiplexing the narrowband STS with the broadband STS assembled from the ATM cells.

48. The cell framer of claim 32, wherein each of the cell delineators is capable of delineating a broadband STS selected from the group consisting of an STS-1, an STS-3c and an STS-12c.

* * * * *